United States Patent
Sato et al.

(10) Patent No.: US 6,733,646 B2
(45) Date of Patent: May 11, 2004

(54) METHOD AND APPARATUS FOR ELECTRODEIONIZATION OF WATER

(75) Inventors: Shin Sato, Tokyo (JP); Takayuki Moribe, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 132 days.

(21) Appl. No.: 10/024,291

(22) Filed: Dec. 21, 2001

(65) Prior Publication Data

US 2002/0125137 A1 Sep. 12, 2002

(30) Foreign Application Priority Data

Jan. 5, 2001 (JP) ........................................ 2001-000678

(51) Int. Cl.[7] ............................................... B01D 61/48
(52) U.S. Cl. ........................................ 204/524; 204/632
(58) Field of Search .................................. 204/524, 632

(56) References Cited

U.S. PATENT DOCUMENTS

| | | |
|---|---|---|
| 3,149,061 A | 9/1964 | Parsi |
| 5,593,563 A | 1/1997 | Denoncourt et al. |
| 5,868,915 A | 2/1999 | Ganzi et al. |
| 6,248,226 B1 * | 6/2001 | Shinmei et al. ............ 204/632 |
| 6,296,751 B1 * | 10/2001 | Mir ............................ 204/524 |

FOREIGN PATENT DOCUMENTS

| | | |
|---|---|---|
| JP | 2699256 | 9/1997 |
| JP | 2751090 | 2/1998 |
| WO | 97/46492 | 12/1997 |

* cited by examiner

Primary Examiner—Arun S. Phasge
(74) Attorney, Agent, or Firm—Kanesaka & Takeuchi

(57) ABSTRACT

An electrodeionization apparatus has an anolyte compartment 17 having an anode 11, a catholyte compartment 18 having a cathode 12, concentrating compartments 15, and desalting compartments 16. The concentrating compartments 15 and the desalting compartments 16 are alternately formed between the anolyte compartment 17 and the catholyte compartment 18 by alternately arranging a plurality of anion-exchange membranes 13 and a plurality of cation-exchange membranes 14. The desalting compartments 16 are filled with ion-exchanger and the concentrating compartments 15 are filled with ion-exchanger, activated carbon, or electric conductor. Electrode water flows into the anolyte compartment 17 and the catholyte compartment 18. Concentrated water is introduced into the concentrating compartments 15. Raw water is fed into the desalting compartment 16 to produce the deionized water from the desalting compartment 16. Water containing silica or boron at a lower concentration than the raw water is introduced into the concentrating compartments 15 as the concentrated water in a direction from a side near an outlet for the deionized water toward a side near an inlet for the raw water of the desalting compartments 16. At least a part of concentrated water flowing out of the concentrating compartments 15 is discharged out of a circulatory system.

22 Claims, 4 Drawing Sheets

METHOD AND APPARATUS FOR ELECTRODEIONIZATION OF WATER

FIELD OF THE INVENTION

The present invention relates to an electrodeionization apparatus, a method of operating an electrodeionization apparatus, and a system for producing ultra pure water.

BACKGROUND OF THE INVENTION

Deionized water is used for various purposes, for example, in plants such as for semiconductor production and liquid crystal display production, in industrial facilities such as for pharmaceutical industry, food industry, and electric power industry, even in households, and in laboratories. Electrodeionization apparatuses are frequently used to produce deionized water as described in Japanese Patent No. 1782943, Japanese Patent No. 2751090, and Japanese Patent No. 2699256. A conventional electrodeionization apparatus of FIG. 2 includes electrodes which consist of an anode 11' and a cathode 12', anion-exchange membranes 13 and cation-exchange membranes 14'. The membranes are alternately arranged in such a manner as to alternately form concentrating compartments 15' and desalting compartments 16' between the anode and the cathode. The desalting compartments 16' are filled with anion-exchanger and cation-exchanger made of ion exchange resin, ion exchange fibers, or graft exchanger. In the desalting compartments 16', the anion-exchanger and cation-exchanger are in the mixed state or multiple-layered state.

Ions flowing into the desalting compartments 16' react with the ion exchanger according to the affinity, concentration, and mobility of the ions and move through the ion exchanger in a direction of potential gradient. The ions further pass through the membranes to hold neutralization of charges in all of the compartments. The ions decrease in the desalting compartments 16' and increase in the concentrating compartments 15' because of the semi-permeability of the membranes and the polarities of potential gradient. This means that cations permeate the cation-exchange membranes 14' and anions permeate the anion-exchange membranes 13' so that the cations and anions are concentrated in the concentrating compartments 15'. Therefore, deionized water (pure water) as product water is recovered from the desalting compartments 16'.

Electrode water flows through an anolyte compartment 17' and a catholyte compartment 18'. The water flowing out of the concentrating compartments 15' (concentrated water) and having high ion concentration is used as the electrode water in order to ensure the electric conductivity.

Raw water is introduced into the desalting compartments 16' and the concentrating compartments 15'. Deionized water (pure water) is taken out from the desalting compartments 16'. Concentrated water in which ions are concentrated is discharged from the concentrating compartments 15'. A part of the concentrated water is circulated into the inlets of the concentrating compartments 15' by a pump (not shown) in order to improve the product water recovery. Another part of the concentrated water is supplied to the inlet of the anolyte compartment 17'. The reminder of the concentrated water is discharged as waste water out of a circulatory system in order to prevent the ion concentration in the circulatory system. Water flowing out of the anolyte compartment 17' is supplied to the inlet of the catholyte compartment 18'. Water flowing out of the catholyte compartment 18' is discharged as waste water out of the circulating system.

The pH in the anolyte compartment 17' is lowered due to $H^+$ generated by dissociation of water. On the other hand, the pH in the catholyte compartment 18' is increased due to generation of $OH^-$. The acid water flowing out of the anolyte compartment 17' flows into the catholyte compartment 18' so that alkalinity in the catholyte compartment 18' can be neutralized, thereby eliminating damages due to scale formation.

Filling activated carbon or ion-exchange resin into electrode compartments is disclosed in U.S. Pat. No. 5,868,915.

The above conventional electrodeionization apparatus do not remove silica and boron at extremely high ratio.

OBJECTS AND SUMMARY OF THE INVENTION

It is an object of the present invention to provide an electrodeionization apparatus which removes silica and boron at extremely high ratio, a method of operating the same, and a system employing the electrodeionization apparatus for producing ultra pure water.

A method for electrodeionization according to a first aspect of the present invention employs an electrodeionization apparatus which has an anolyte compartment having an anode, a catholyte compartment having a cathode, at least one concentrating compartment, and at least one desalting compartment. The concentrating compartment(s) and the desalting compartment(s) are formed between the anolyte compartment and the catholyte compartment by alternately arranging at least one anion-exchange membrane(s) and at least one cation-exchange membrane(s). The desalting compartment(s) is (are) filled with ion-exchanger, and the concentrating compartment(s) is (are) filled with ion-exchanger, activated carbon, or an electric conductor. Electrode water flows into the anolyte compartment(s) and the catholyte compartment(s). Concentrated water flows into the concentrating compartment(s). Raw water flows into the desalting compartment(s) and the deionized water flows out of the desalting compartment(s). The concentrated water includes silica or boron at a lower concentration than the raw water. The concentrated water flows into the concentrating compartment(s) at a side near an outlet for the deionized water of the desalting compartment and flows out from the concentrating compartment(s) at a side near an inlet for the raw water of the desalting compartment. At least a part of the concentrated water flowing out of the concentrating compartments is discharged out of the circulating system.

An electrodeionization apparatus according to a second aspect of the present invention has an anolyte compartment having an anode, a catholyte compartment having a cathode, at least one concentrating compartment, and at least one desalting compartment. The concentrating compartment(s) and the desalting compartment(s) are alternately formed between the anolyte compartment and the catholyte compartment by alternately arranging at least one anion-exchange membrane(s) and at least one cation-exchange membrane(s). The desalting compartment(s) is (are) filled with ion-exchanger, and the concentrating compartment(s) is (are) filled with ion-exchanger, activated carbon, or an electric conductor. The electrodeionization apparatus further has a device for introducing electrode water into the anolyte compartment and the catholyte compartment; a concentrated water introducing device for introducing concentrated water into the concentrating compartment(s); and a device for introducing raw water into the desalting compartment(s) to produce the deionized water. The concentrated water introducing device introduces water containing silica or boron at a lower concentration than the raw water into the concentrating compartment(s) at a side near an outlet for the deionized water of the desalting compartment(s). The concentrated water flows out of the concentrating compartments at a side near an inlet for the raw water of the desalting compartment(s). At least a part of concentrated water flowing out of the concentrating compartments is discharged out of a circulating system.

A system for producing ultra pure water of the present invention has the above electrodeionization apparatus of the second aspect of the present invention.

Decreasing in silica or boron concentration in the concentrated water flowing into the concentrating compartment near the outlet for the product water leads to decrease in silica or boron concentration in the product water.

By introducing concentrated water containing silica or boron at a lower concentration than the raw water into the desalting compartments at a side near the outlet for the deionized water (product water) in a direction toward a side near the inlet for the raw water, the silica or boron concentration of product water is significantly decreased.

By introducing water having low electric conductivity and high resistivity in the concentrating compartments, the electric resistance of the water in the concentrating compartments is increased.

The ion exchanger such as ion-exchange resin, activated carbon, or electric conductor filled in the concentrating compartments reduces the electric resistance of the concentrating compartments, allowing much electric current to flow.

$H^+$ ions and $OH^-$ ions produced by dissociation of water among the ion-exchange resins carry electric charges, so that voltage between electrodes is prevented from rising so as to allow enough current to flow between the electrodes even when water having high resistivity such as ultra pure water flows in the electrodeionization apparatus.

BRIEF DESCRIPTION OF THE DRAWINGS

FIG. 3b is a schematic flow diagram of the apparatus of FIG. 3a; and

DETAILED DESCRIPTION OF THE PREFERRED EMBODIMENTS

Figure 1:
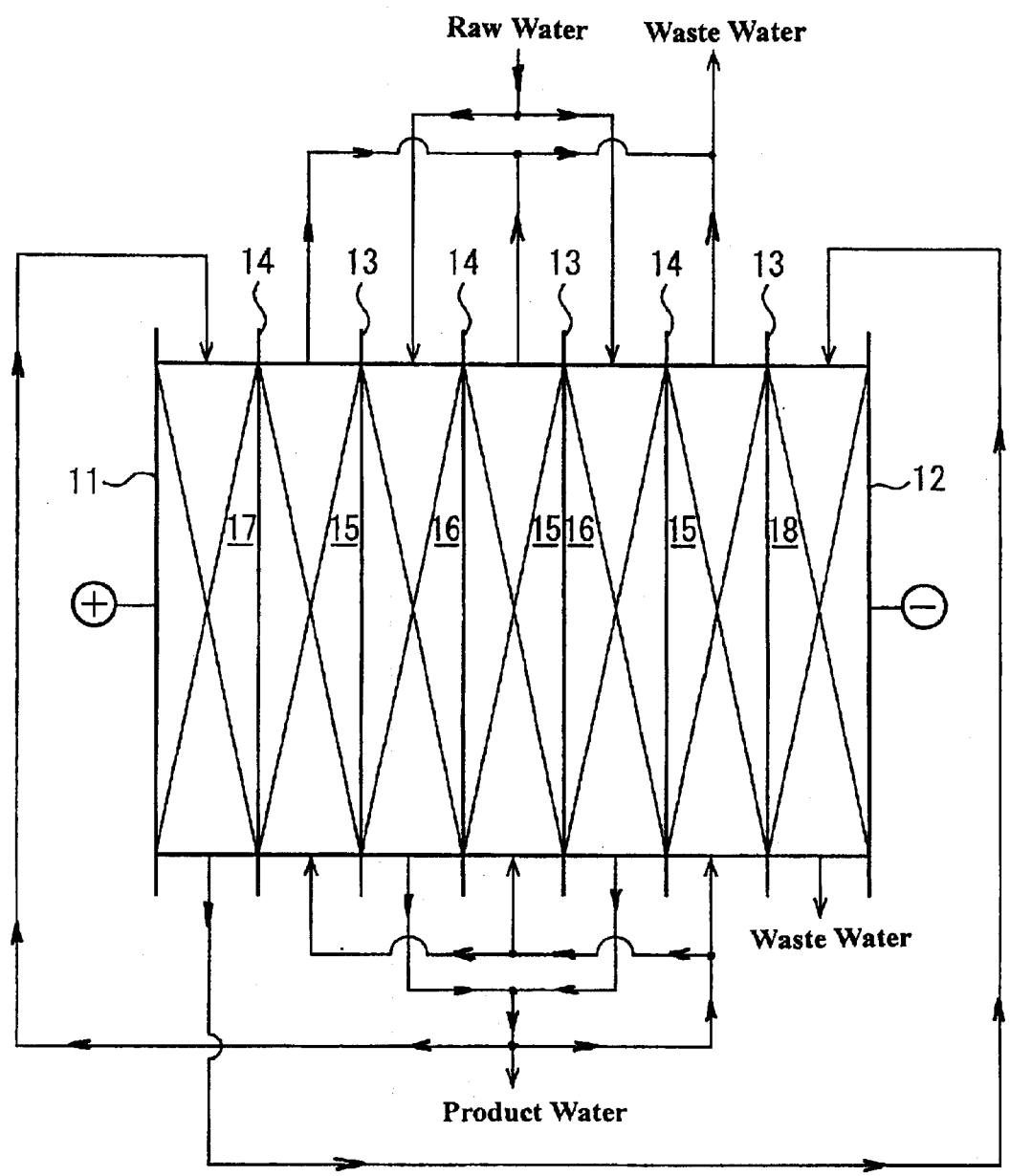
FIG. 1 is a schematic sectional view showing an electrodeionization apparatus according to an embodiment of the present invention.

An electrodeionization apparatus shown in FIG. 1 has a plurality of anion-exchange membranes 13 and a plurality of cation-exchange membranes 14 which are alternately arranged between the electrodes (anode 11, cathode 12), concentrating compartments 15, and desalting compartments 16. The concentrating compartments 15 and the desalting compartments 16 are each defined between the membranes 13 and 14 and are therefore alternately arranged between the electrodes. The desalting compartments 16 are filled with anion-exchanger and cation-exchanger made of ion exchange resin, ion exchange fibers, or graft exchanger. In the desalting compartments 16, the anion-exchanger and cation-exchanger are filled in the mixed state or multiple-layered state.

The concentrating compartments 15, anolyte compartment 17, and catholyte compartment 18 are filled with electric conductive media such as ion exchanger, activated carbon, or metal.

Raw water is introduced into the desalting compartments 16. Product water is taken out from the desalting compartments 16. A part of the product water flows into the concentrating compartments 15 in a direction opposite to the flowing direction of the desalting compartments 16 i.e. in single-pass counter-flow manner. Water flowing out of the concentrating compartments 15 is discharged out of a system of the apparatus. The concentrating compartments 15 are provided with inlets on the same side of the outlets for the product water of the desalting compartments 16 and provided with outlets on the same side of the inlets for the raw water of the desalting compartments 16. Another part of the product water is supplied to the inlet of the anolyte compartment 17. Water flowing out of the anolyte compartment 17 is supplied to the inlet of the catholyte compartment 18. Water flowing out of the catholyte compartment 18 is discharged as waste water out of the system.

By introducing product water into the concentrating compartments 15 in the single-pass counter-flow manner relative to the desalting compartments 16, the concentrated water in the concentrating compartment 15 near the outlets for product water has the lowest ion concentration, whereby the ion diffusion to the desalting compartments 16 due to the concentration diffusion is restricted, and the ions are removed at a high rate. Especially, silica and boron ions are removed at an extremely high rate.

Figure 2:
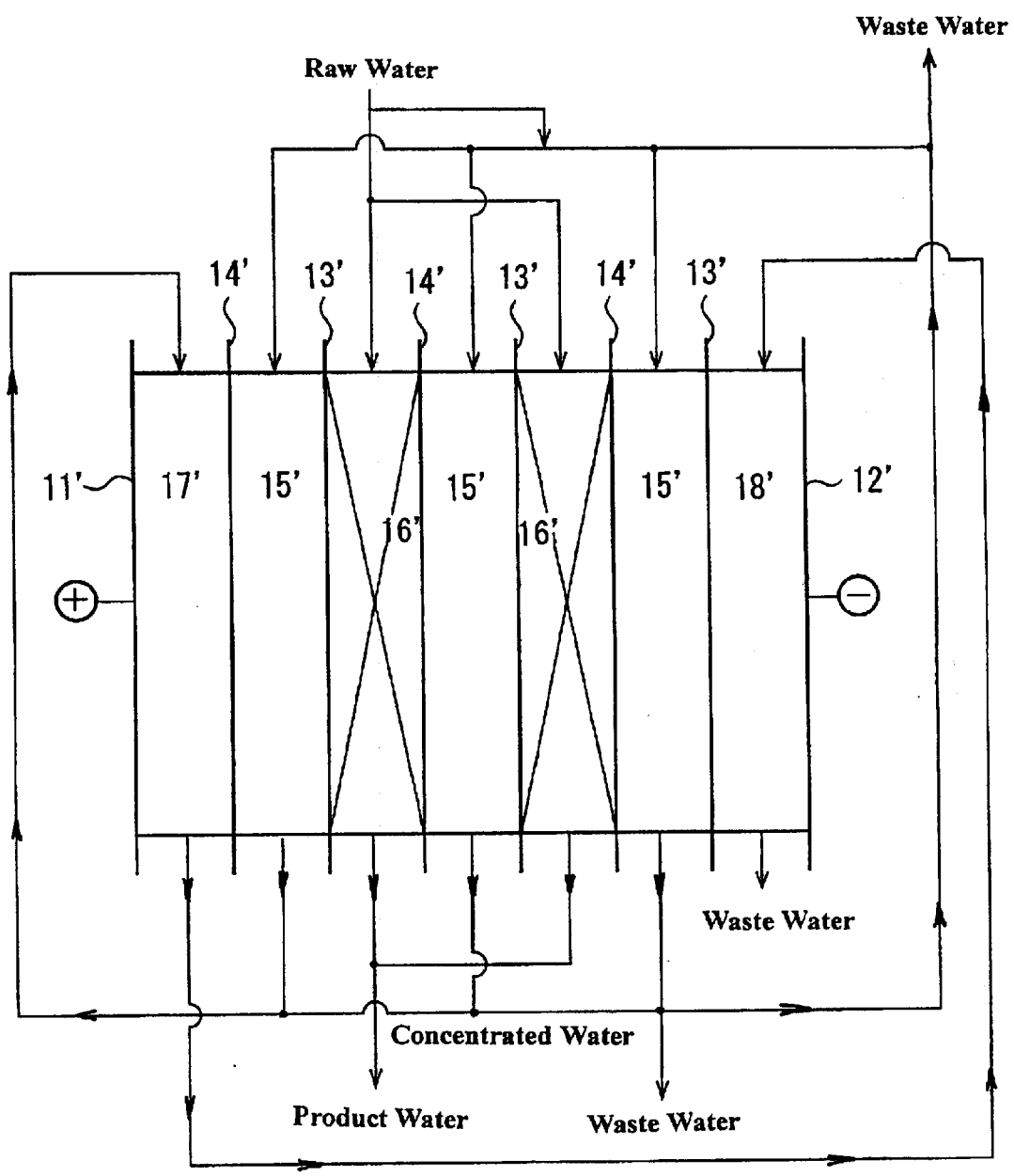
FIG. 2 is a schematic sectional view showing a conventional electrodeionization apparatus.

In the conventional electrodeionization apparatus, a part of concentrated water (water flowing out of the concentrating compartments) is discharged as shown in FIG. 2 in order to improve the product water recovery. The remainder of the concentrated water is circulated to the inlets of the concentrating compartments. In the conventional apparatus, the LV (line velocity) in the concentrating compartments is 80 m/hr or more.

Since the ion exchanger is filled in the concentrating compartments in the present embodiment of the invention, deionizing property can be ensured even when the LV in the concentrating compartments is 20 m/hr or less. The reasons will be described as follows. When a spacer is placed in each concentrating compartment, it is required to disperse condensed silica and condensed boron on membranes by water flows in the concentrating compartment. However, when the ion exchanger is filled in the concentrating compartments, ions are dispersed through the ion exchanger, thereby eliminating the necessity of high line velocity (LV).

Because the high line velocity is not necessary, the product water recovery can be higher than the conventional one even though the concentrated water flows in the single-pass manner. In addition, no circulation pump is required, whereby the apparatus can be more economical.

The silica concentration of concentrated water flowing at locations corresponding to the outlets for product water is preferable to as low as possible. It is desirable that the silica concentration is not greater than 1000 times as great as that of the product water.

Though the filler for the concentrating compartments may be activated carbon to ensure required current, ion exchanger is preferably used rather than activated carbon because of the ion diffusion action as mentioned above.

In the electrodeionization apparatus shown in FIG. 1, a part of the product water is also supplied to the electrode compartments 17, 18. In order to ensure desired current, the electrode compartments 17, 18 are filled with ion exchanger, activated carbon, or metal as electric conductive media in the same manner as the concentrating compartments 15. This makes the applied voltage constant regardless of water quality. Therefore, even when high quality water such as ultra pure water is flowed, desired current can be ensured.

In the electrode compartments, particularly in the anolyte compartment, oxidizing agent such as chlorine and ozone are produced. Therefore, the filler is more preferably activated carbons for long-term use rather than ion-exchange resin. As shown in FIG. 1, it is preferable to feed product water having little or no Cl⁻ into the electrode compartments in view of long-term stabilization of the filler and the electrodes because production of chlorine in the electrode compartments is prevented.

The electrode compartments may not be filled with the aforementioned filler. For example, each electrode plate is provided, on a water flowing side, with a structure being porous so that electrode water permeates the porous portion. In this case, the electrode plates and the electrode compartments can be formed as an integral part, thereby facilitating the assembly.

When the concentrated water is circulated in the concentrating compartment the inside of which is not divided, the concentration of silica and boron should be higher near the outlets for product water. When concentrated water is circulated in a concentrating compartment the inside of which is divided as shown in FIGS. 3a, 3b, the concentration at the side near the inlet for raw water is higher than that at the side near the outlet for product water so that the quality of product water is substantially equal to the quality of product water obtained in the single-pass counter-flow arrangement of FIG. 1.

Figure 3A:
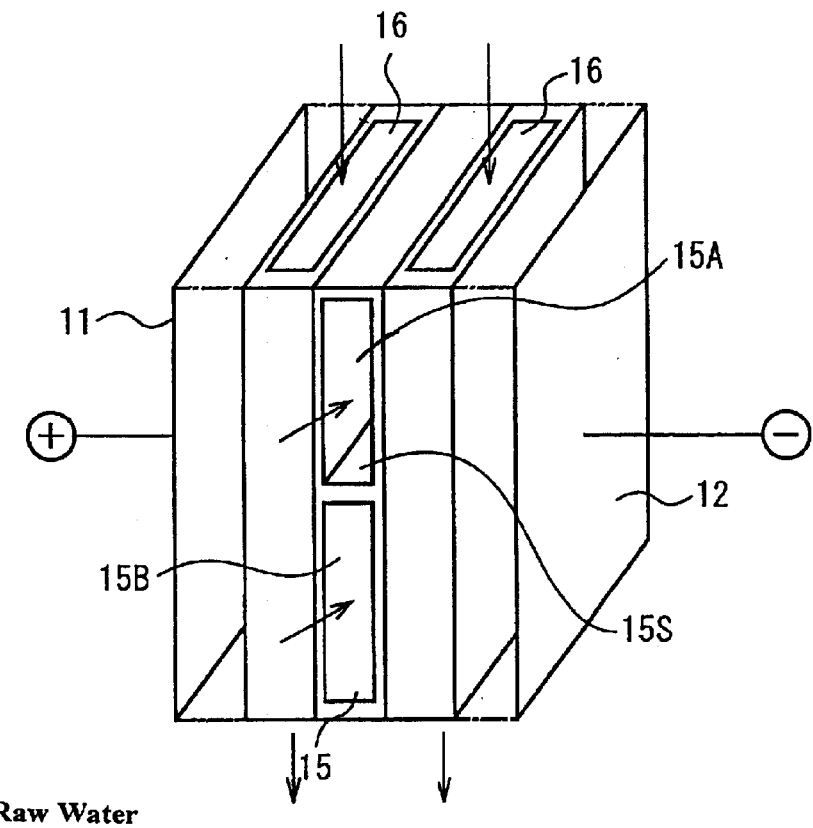
FIG. 3a is a perspective view schematically showing an electrodeionization apparatus according to another embodiment of the present invention.
Figure 3B:
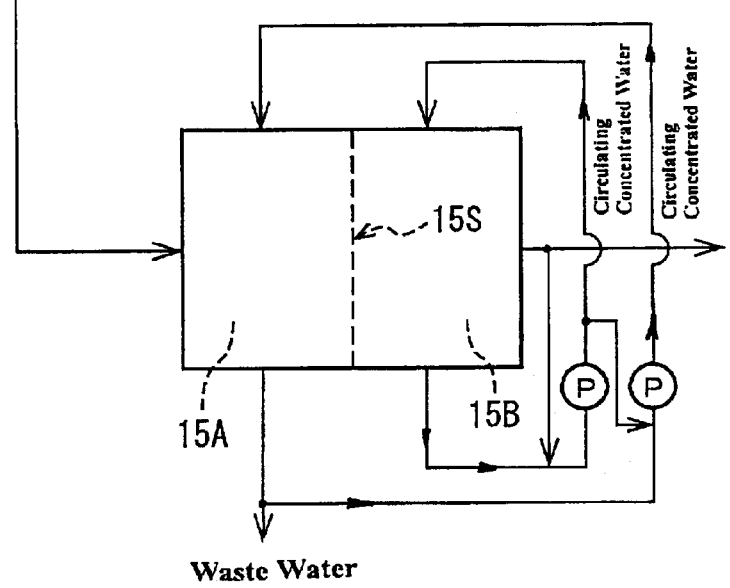

Electrodeionization apparatuses shown in FIGS. 3a, 3b have an anode 11 and a cathode 12. Cation-exchange membranes and anion-exchange membranes are alternately arranged between the anode 11 and the cathode 12 to define alternately a concentrating compartment 15 and desalting compartments 16. The concentrating compartment 15 is divided into two or more (two in FIGS. 3a, 3b) concentrated water flowing sections 15A, 15B by a partition 15S. The flowing direction of concentrated water in each concentrated water flowing section 15A, 15B crosses the flowing direction in the desalting compartments 16.

Each desalting compartment 16 has an inlet at the top and an outlet at the bottom in FIG. 3a so that water flows downwardly in a vertical direction.

The concentrating compartment 15 is provided with the partition 15S extending in a direction crossing the flowing direction in the desalting compartments 16. Although the direction is perpendicular to the flowing direction of the desalting compartments 16 in FIG. 3a, the term "perpendicular" includes a range of angle between 80–100°. The inside of the concentrating compartment 15 is divided into two stages which are arranged vertically in FIG. 3a, by the partition 15S. Water flows from the front to the back in FIG. 3a in the respective concentrated water flowing sections 15A, 15B.

As shown in FIG. 3b, a part of the product water flowed out of the desalting compartments is introduced into a circulatory system of the concentrated water flowing section 15B in which the circulation is conducted by a pump. The part of product water is thus circulated in the concentrated water flowing section 15B near the outlets for product water. A part of circulating concentrated water from the circulatory system is introduced into a circulatory system of the concentrated water flowing section 15A in which the circulation is conducted by a pump. The part of circulating concentrated water is thus circulated in the concentrated water flowing section 15A near the inlets for raw water. A part of circulating concentrated water from the concentrated water flowing section 15A near the inlets for raw water is discharged out of the circulatory system.

In the electrodeionization apparatus of FIGS. 3a, 3b, after a part of product water enters into a circulatory system of the concentrated water flowing section 15B near the outlet for product water and is circulated therein, a part of circulated water from the concentrated water flowing section 15B enters into a circulatory system of the circulated water flowing section 15A near the inlet for raw water, is circulated therein, and is discharged out of the circulatory system. This means that concentrated water is flowed from the side of the outlets for product water to the side of the inlets for raw water and, after that, is partially discharged out of the circulatory system. Accordingly, the apparatus exhibits the same effects as the case shown in FIG. 1 in which water in the concentrating compartment flows in the single-pass counter-flow manner relative to the desalting compartment.

There may be three or more concentrated water flowing sections defined by partitions in the concentrating compartment. In view of the increase in number of partitions or parts and complexity of the apparatus structure, the concentrating compartment is preferably divided into two or three concentrated water flowing sections.

The smallest possible thickness of the desalting compartment is preferable for removing not only silica but also boron in the electrodeionization apparatus. The thickness of the desalting compartment is preferably 5 mm or less. However, in view of water permeability and ease of manufacturing, the thickness is preferably 2 mm or more in practice.

According to the present invention, required current passes between the electrodes and silica and boron are removed at high rate while eliminating the influence of concentration diffusion. The required current passes in the apparatus having the above-described concentrating compartment and the electrode compartments. The current required for increasing the removal ratio of silica and boron is a current value corresponding to current efficiency of 10% or less. To obtain the removal ratio of silica and boron of 99.9% or more, the required current is a current value preferably corresponding to current efficiency of 5% or less. The current efficiency is expressed by the following equation:

$$\text{Current Efficiency } (\%) = 1.31 [\text{flow rate per cell } (L/min)][[\text{equivalent conductivity of raw water } (\mu S/cm)] - [\text{equivalent conductivity of treated water } (\mu S/cm)]] / \text{current } (A)$$

According to the electrodeionization apparatus of the present invention, required current can be ensured even when water having high resistivity is fed as raw water into the electrodeionization apparatus and it is required to decrease further only silica and boron in the raw water.

It should be noted that if no current flows in any one of concentrating compartments and electrode compartments in a conventional electrodeionization apparatus, current does not flow through the apparatus.

On the other hand, the apparatus of the present invention can remove silica and boron from raw water having high resistivity. Therefore, the electrodeionization apparatus of the present invention can treat various kinds of water.

For example, the electrodeionization apparatus can be employed as a primary pure water producing apparatus in a semiconductor plant. Even when product water produced by the primary pure water producing apparatus is consumed in small quantities and the remainder is returned to be circulated as raw water so as to make the raw water have high resistivity, required current can be ensured. Therefore, the apparatus can be stably started up.

Even when a plurality of electrodeionization apparatuses of the present invention are arranged in series and raw water is introduced in these apparatus, required current for the subsequent apparatus can also be secured.

The electrodeionization apparatus of the present invention can be employed also as a secondary pure water producing system called sometimes "sub-system" in an ultra pure water producing process. Even when water having resistivity of 10 MΩ·cm or more is fed as raw water into this apparatus, required current can be ensured. Therefore, the electrodeionization apparatus of the present invention can be employed as an alternative to a demminer (non-regenerative mixed-bed ion exchange apparatus) as shown in FIG. 4.

Figure 4:
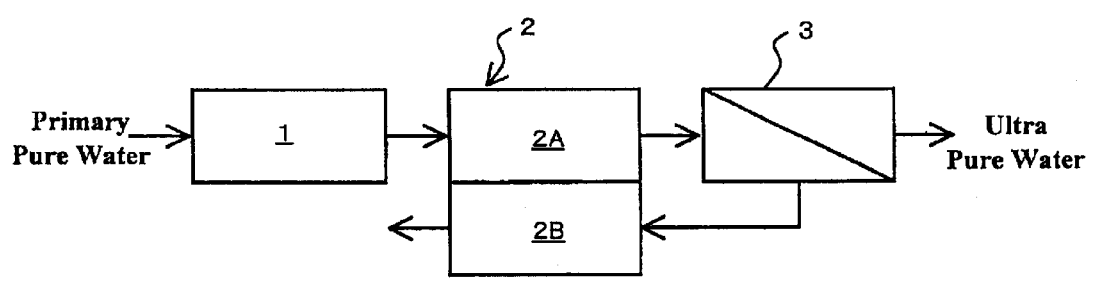
FIG. 4 is a schematic flow diagram of a system for producing ultra pure water in which the electrodeionization apparatus of the present invention is employed.

In the sub-system of FIG. 4, primary pure water having resistivity of 10 MΩ·cm or more is introduced into a desalting compartment 2A of the electrodeionization apparatus 2 via an ultraviolet oxidizing apparatus 1. Product water from the electrodeionization apparatus 2 is treated at an ultrafiltration membrane separation apparatus 3 so as to produce ultra pure water. Taking the entire water balance into consideration, concentrated water from the ultrafiltration membrane separation apparatus 3 may be employed as feed water to the concentrating compartment 2B of the electrodeionization apparatus 2. Therefore, efficiency for water utilization of a system as a whole can be increased.

Hereinafter, examples and comparative examples will be described.

EXAMPLE 1

City water was first filtered with activated carbon, treated by reverse osmosis separator, and further treated with membrane deaerator to become raw water having quality shown in Table 1. The raw water was deionized by the electrodeionization apparatus of FIG. 1 having two desalting compartments and three concentrating compartments and having the following specification. The electrodeionization apparatus was operated under the following operating conditions.
[Specification of Electrodeionization Apparatus]
Height of Desalting Compartment: 66 cm
Thickness of Desalting Compartment: 2.5 mm
Thickness of Concentrating Compartment: 2.5 mm
Filler for Desalting Compartment: Mixed ion-exchange resin of anion-exchange resin:cation-exchange resin= 7:3 (by volume)
Filler for Concentrating Compartment: Mixed ion-exchange resin of anion-exchange resin:cation-exchange resin=7:3 (by volume)
Filler for Anolyte and Catholyte Compartments: Activated carbon
[Operating Conditions]
Current: 2A (Current Efficiency 4%)
Desalting Compartment SV: 130 hr$^{-1}$
Concentrating Compartment LV: 13 m/hr
Product Water: 60 L/hr
Water in Concentrating Compartment: 9 L/hr
Water in Electrode compartment: 5 L/hr
Water Recovery: 81% (=60÷(60+9+5)×100)

Product water flowed at 74 L/hr, and 9 L/hr of the product water was introduced into the concentrating compartments in the single-pass counter-flow manner and 5 L/hr was supplied to the anolyte compartment and then flowed in the catholyte compartment.

Resultant product water was high-purity water in which both silica and boron were removed to a high degree so that both residual silica and boron were under the detection limit as shown in Table 1.

Applied voltage for the above experiment was 9.7V in total, that is, desalting compartment: 1.28V×2, concentrating compartment: 1.28V×3, anolyte compartment: 1.4V, and catholyte compartment: 1.9V.

TABLE 1

|  | Raw Water | Product Water |
| --- | --- | --- |
| Silica (ppb) | 300 | 0.1 or less (under detection limit) |
| Boron (ppb) | 10 | 0.1 or less (under detection limit) |
| Conductivity (μS/cm) | 10 | — |
| Resistivity (MΩ · cm) | — | 18 |

EXAMPLE 2

Deionization was conducted under the same conditions as Example 1 except that the raw water was prepared by adding sodium silicate into ultra pure water to have sodium silicate concentration of 300 ppb (SiO$_2$ conversion).

The raw water contains low ion concentration, so that it is difficult to ensure required current. However, the product water had high-purity such that silica concentration was 0.1 ppb or less (under the detection limit).

Applied voltage for the above experiment was also 9.7 volts in total, that is, desalting compartment: 1.28V×2, concentrating compartment: 1.28V×3, anolyte compartment: 1.4V, and catholyte compartment: 1.9V.

COMPARATIVE EXAMPLE 1

An experiment was operated by using the apparatus as shown in FIG. 2 under the same conditions as Example 1 except that the concentrated water rate was 60 L/hr and the concentrated water discharge rate was 9 L/hr.

The product water had resistivity of 17 MΩ·cm and silica concentration of 6 ppb.

As described above, according to the present invention, the electrodeionization apparatus produces high-purity product water in which both silica and boron are removed to a high degree. Conventional electrodeionization apparatuses could not sufficiently remove silica and boron.

What is claimed is:

1. A method of operating an electrodeionization apparatus which includes an anolyte compartment having an anode, a catholyte compartment having a cathode, at least one concentrating compartment containing at least one of ion-exchanger, activated carbon and electric conductor, and at least one desalting compartment containing ion-exchanger, the concentrating compartment and the desalting compartment being formed between the anolyte compartment and the catholyte compartment by arranging at least one anion-exchange membrane and at least one cation-exchange membrane, said method comprising:

supplying electrode water into the anolyte compartment and the catholyte compartment;

feeding raw water into the desalting compartment through an inlet thereof so that deionized water flows out from the desalting compartment through an outlet thereof; and supplying a part of the deionized water into the concentrating compartment from a side adjacent to the outlet of the desalting compartment and ejecting the part of the deionized water as concentrated water from the concentrating compartment from a side adjacent the inlet of the desalting compartment so that the part of the deionized water introduced in the concentrating compartment flows in a direction opposite to the raw water flowing through the desalting compartment, at least a part of the concentrated water flowing out of the concentrating compartment being discharged out of a circulatory system.

2. A method of operating an electrodeionization apparatus as claimed in claim 1, wherein the concentrated water flows in the concentrating compartment in single-pass counter-flow manner relative to the raw water flowing in the desalting compartment.

3. A method of operating an electrodeionization apparatus as claimed in claim 1, wherein the water supplied to the concentrating compartment is at least one of desalted water directly obtained from the electrodeionization apparatus, and treated water produced by further treating the desalted water by another ion exchange apparatus.

4. A method of operating an electrodeionization apparatus as claimed in claim 1, wherein the anolyte compartment and the catholyte compartment are filled with at least one of activated carbon, ion-exchanger, and electric conductor.

5. A method of operating an electrodeionization apparatus as claimed in claim 1, wherein the anode is in contact with the cation-exchange membrane which defines the anolyte compartment, the cathode is in contact with the anion-exchange membrane which defines the catholyte compartment, and the anode and the cathode are each provided, at least at a side being in contact with the corresponding membrane, with a porous structure having continuous multiple apertures through which the electrode water flows.

6. A method of operating an electrodeionization apparatus as claimed in claim 1, wherein the concentrated water flows in the concentrating compartment at a line velocity (LV) of 20 m/hr or less.

7. A method of operating an electrodeionization apparatus as claimed in claim 1, wherein the desalting compartment is has a thickness of 2–5 mm.

8. A method of operating an electrodeionization apparatus as claimed in claim 1, wherein the electrodeionization apparatus is operated under a current value such that current efficiency of the electrodeionization apparatus expressed by the following equation is 10% or less:

Current Efficiency (%)=1.31[flow rate per cell (L/min)][equivalent conductivity of raw water ($\mu$S/cm]–[equivalent conductivity of treated water ($\mu$S/cm)]]/current (A).

9. A method of operating an electrodeionization apparatus as claimed in claim 8, wherein the electrodeionization apparatus as operated under a current value that the current efficiency is 5% or less.

10. A method of operating an electrodeionization apparatus as claimed in claim 1, wherein a part of the deionized water is introduced into the anolyte compartment.

11. An electrodeionization apparatus comprising:

an anolyte compartment having an anode;

a catholyte compartment having a cathode;

at least one concentrating compartment having an inlet and an outlet;

at least one desalting compartment situated adjacent to the at least one concentrating compartment and having an inlet adjacent to the outlet of the at least one concentrating compartment and an outlet adjacent to the inlet of the at least one concentrating compartment, where in the concentrating compartment and the desalting compartment are formed between the anolyte compartment and the catholyte compartment by arranging at least one anion-exchange membrane and at least one cation-exchange membrane;

ion-exchanger with which the desalting compartment is filled;

at least one of ion-exchanger, activated carbon, and electric conductor which fills the concentrating compartment;

a device for introducing electrode water into the anolyte compartment and the catholyte compartment, respectively;

a device for feeding raw water into the desalting compartment through the inlet thereof so that deionized water, flows out of the desalting compartment through the outlet thereof; and a concentrated water introducing device for introducing a part of the deionized water into the concentrating compartment front the inlet adjacent to the outlet of the desalting compartment, said concentrated water introducing device discharging concentrated water out of the concentrating compartment from the outlet adjacent to the inlet of the desalting compartment and further discharging at least a part of the concentrated water flowing out of the concentrating compartment out of a circulatory system.

12. An electrodeionization apparatus as claimed in claim 11, wherein the concentrated water introducing device introduces the concentrated water into the concentrating compartment in single-pass counter-flow manner relative to the raw water flowing in the desalting compartment.

13. An electrodeionization apparatus as claimed in claim 11, wherein the concentrated water introducing device introduces one of desalted water produced by the electrodeionization apparatus, and treated water prepared by further treating the desalted water by another ion exchange apparatus.

14. An electrodeionization apparatus as claimed in claim 11, wherein the anolyte compartment and catholyte compartment are filled with at least one of activated carbon, ion-exchanger, and electric conductor.

15. An electrodeionization apparatus as claimed in claim 11, wherein the anode is in contact with the cation-exchange membrane which defines the anolyte compartment, the cathode is in contact with the anion-exchange membrane which defines the catholyte compartment, and the anode and the cathode are each provided, at least at a side being in contact with the corresponding membrane, with a porous structure having continuous multiple apertures through which the electrode water flows in the anolyte compartment and the catholyte compartment.

16. An electrodeionization apparatus as claimed in claim 11, wherein the concentrated water introducing device provides the water to flow at a line velocity (LV) of 20 m/hr or less.

17. An electrodeionization apparatus as claimed in claim 11, wherein the desalting compartment has a thickness of 2–5 mm.

18. An electrodeionization apparatus as claimed in claim 11, wherein the anode and cathode receives a current has at a current value such that current efficiency of the electrodeionization apparatus expressed by the following equation is 10% or less:

$$\text{Current Efficiency (\%)} = 1.31 [\text{flow rate per cell } (L/min)][[\text{equivalent conductivity of raw water } (\mu S/cm)] - [\text{equivalent conductivity of treated water } (\mu S/cm)]]/\text{current } (A).$$

19. An electrodeionization apparatus as claimed in claim 18, wherein the current has a current value that the current efficiency of the electrodeionization apparatus expressed by the following equation is 5% or less.

20. A system for producing ultra pure water comprising the electrodeionization apparatus as claimed in claim 11.

21. A system for producing ultra pure water as claimed in claim 20, further comprising an ultrafiltration membrane separation apparatus into which the deionized water from the electrodeionization apparatus is introduced, wherein the concentrated water front the ultrafiltration membrane separation apparatus is introduced into the concentrating compartment of the electrodeionization apparatus.

22. An electrodeionization apparatus as claimed in claim 11, wherein the device for introducing the electrode water into the anolyte compartment introduces a part of the deionized water into the anolyte compartment.

* * * * *